(12) United States Patent
Chu et al.

(10) Patent No.: US 11,304,127 B2
(45) Date of Patent: Apr. 12, 2022

(54) BEACONING AND CAPABILITY AND BASIC SERVICE SET PARAMETER ANNOUNCEMENT FOR MULTI-BAND OPERATION

(71) Applicant: NXP USA, Inc., Austin, TX (US)

(72) Inventors: Liwen Chu, San Ramon, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 62 days.

(21) Appl. No.: 16/993,445

(22) Filed: Aug. 14, 2020

(65) Prior Publication Data

US 2021/0051574 A1 Feb. 18, 2021

Related U.S. Application Data

(60) Provisional application No. 62/892,451, filed on Aug. 27, 2019, provisional application No. 62/886,826, filed on Aug. 14, 2019.

(51) Int. Cl.
| | | |
|---|---|---|
| *H04W 48/16* | (2009.01) | |
| *H04W 88/06* | (2009.01) | |
| *H04W 80/02* | (2009.01) | |
| *H04W 24/10* | (2009.01) | |
| *H04W 76/11* | (2018.01) | |
| *H04W 84/18* | (2009.01) | |

(52) U.S. Cl.
CPC ........... *H04W 48/16* (2013.01); *H04W 24/10* (2013.01); *H04W 76/11* (2018.02); *H04W 80/02* (2013.01); *H04W 84/18* (2013.01); *H04W 88/06* (2013.01)

(58) Field of Classification Search
CPC . H04W 72/0453; H04W 45/18; H04W 76/11; H04W 52/0216; H04W 4/80; H04W 40/248
See application file for complete search history.

(56) References Cited

U.S. PATENT DOCUMENTS

| | | | |
|---|---|---|---|
| 11,134,542 B2 * | 9/2021 | Stacey | ................... H04W 4/80 |
| 2019/0150063 A1 | 5/2019 | Chu et al. | |
| 2019/0268892 A1 | 8/2019 | Gidvani et al. | |
| 2020/0162964 A1 | 5/2020 | Srinivasa et al. | |
| 2020/0221545 A1 * | 7/2020 | Stacey | ............. H04W 72/0453 |

(Continued)

FOREIGN PATENT DOCUMENTS

WO WO-2020061032 A1 * 3/2020 ........... H04B 7/2606

OTHER PUBLICATIONS

"IEEE Recommended Practice for Network Reference Model and Functional Description of IEEE 802(R) Access Network," in IEEE Std 802.1CF-2019 , vol. no., pp. 1-185, May 31, 2019, doi: 10.1109/IEEESTD.2019.8726453. (Year: 2019).*

(Continued)

*Primary Examiner* — William D Cumming

(57) ABSTRACT

Operating a wireless communications network includes transmitting a management frame by a first multi-link entity of a set of entities using a reporting link associated with a first network identifier and a first communication band. The management frame includes first information associated with the first multi-link entity and second information associated with a second link of the set of entities. The second link is associated with a second network identifier.

20 Claims, 11 Drawing Sheets

(56) References Cited

U.S. PATENT DOCUMENTS

| | | | |
|---|---|---|---|
| 2021/0051574 A1* | 2/2021 | Chu | H04W 48/16 |
| 2021/0160941 A1* | 5/2021 | Patil | H04W 76/15 |
| 2021/0160958 A1* | 5/2021 | Patil | H04L 1/1642 |
| 2021/0212150 A1* | 7/2021 | Chu | H04W 76/11 |
| 2021/0282229 A1* | 9/2021 | Stacey | H04W 52/0216 |
| 2021/0314846 A1* | 10/2021 | Chu | H04W 40/248 |

OTHER PUBLICATIONS

IEEE, "Part 11: Wireless LAN Medium Access Control (MAC) and Physical Layer (PHY) Specifications," P802.11-REVmdTM/D3.0, Oct. 2019, 4647 pages.

IEEE, "Part 11: Wireless LAN Medium Access Control (MAC) and Physical Layer (PHY) Specifications, Amendment 1: Enhancements for High Efficiency WLAN," P802.11ax™/D6.0, Nov. 2019, 780 pages.

U.S. Appl. No. 16/911,102, filed Jun. 24, 2020, 18 pages.

* cited by examiner

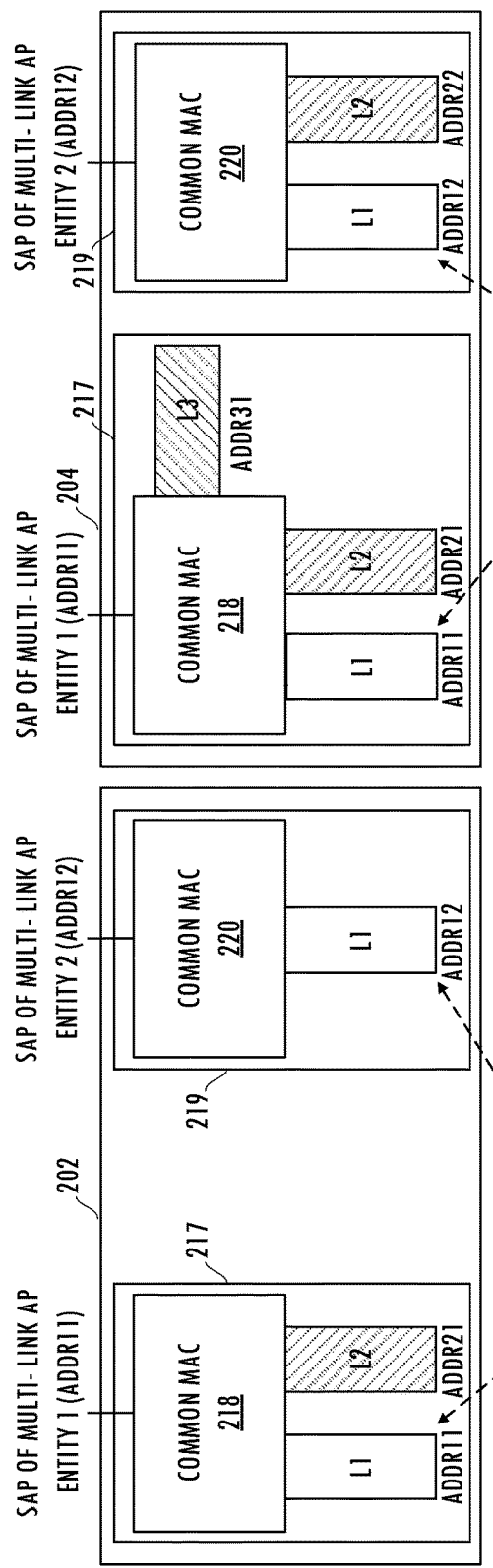
FIG. 3A
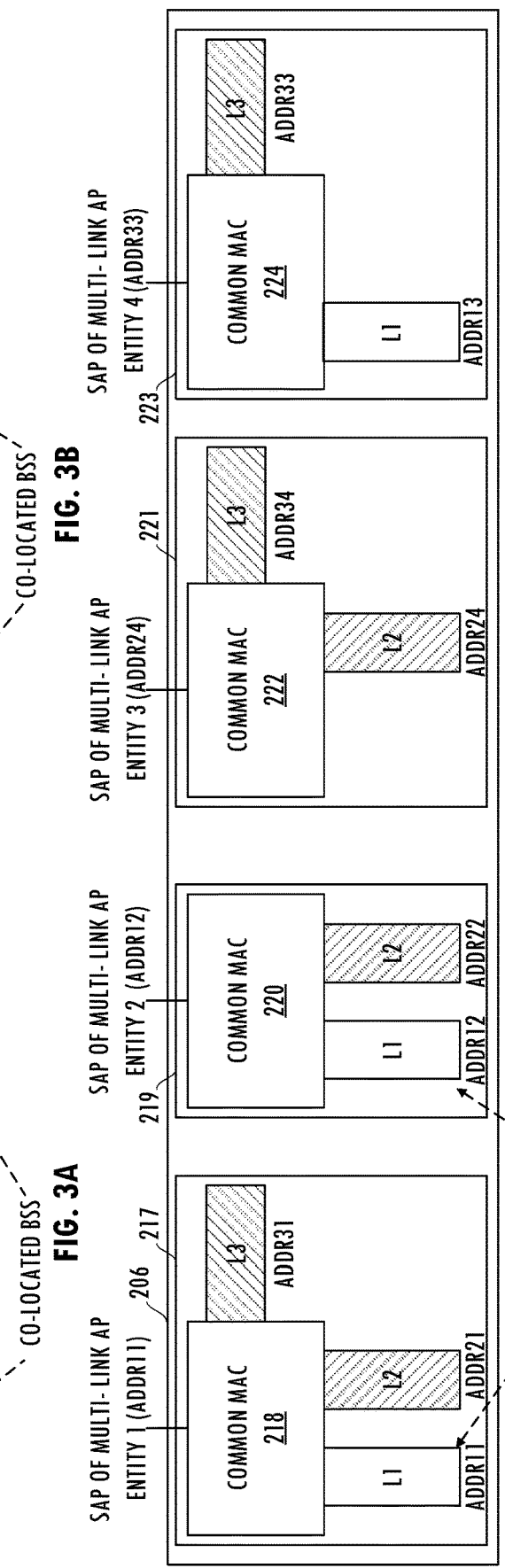
FIG. 3B
FIG. 3C

BEACONING AND CAPABILITY AND BASIC SERVICE SET PARAMETER ANNOUNCEMENT FOR MULTI-BAND OPERATION

CROSS-REFERENCE TO RELATED APPLICATION(S)

This application claims benefit of U.S. Provisional Application No. 62/886,826, entitled "MULTI-BAND OPERATION: BEACONING, CAPABILITY AND BASIC SERVICE SET (BSS) PARAMETER ANNOUNCEMENT," naming Liwen Chu, Hongyuan Zhang, and Hui-Ling Lou, filed Aug. 14, 2019, and U.S. Provisional Application No. 62/892,451, entitled "MULTI-BAND OPERATION: BEACONING, CAPABILITY AND BASIC SERVICE SET (BSS) PARAMETER ANNOUNCEMENT," naming Liwen Chu, Hongyuan Zhang, and Hui-Ling Lou as inventors, filed Aug. 27, 2019, which applications are incorporated herein by reference in their entirety.

BACKGROUND

Field

This disclosure relates to communications networks, and more particularly, to multi-band operation of communications networks.

Description of the Related Art

In general, a communication protocol provides a set of rules that allow two or more entities (e.g., access point (AP) or mobile station (STA)) of a communications network to communicate information via a variation of a physical quantity. Each entity (i.e., each AP or each STA) in the communications network can include multiple radios (i.e., can be a multi-link entity). A conventional network device includes multiple APs and advertises information associated with each radio or link of the network device using at least one management frame (e.g., a Beacon, Probe Request, Probe Response, Association Request, or Association Response frame) for each of the radios or links. A STA having multiple links must sense multiple links before association with an AP, which requires substantial latency for scanning and association and consumes substantial amounts of power.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIGS. 3A, 3B, and 3C illustrate functional block diagrams of exemplary multi-band devices including multiple basic service sets for a wireless communications network.

The use of the same reference symbols in different drawings indicates similar or identical items.

DETAILED DESCRIPTION

Techniques for announcing information (e.g., information associated with multiple Basic Service Set Identifiers (BSSIDs) among multiple bands) for operation of multi-band entities in a communications network are described. In embodiments of a communications network described below, a wireless network device, e.g., an access point (AP) multi-link device (MLD) with multiple affiliated access points (APs) of a wireless local area network (WLAN), communicates data streams with at least one mobile station (STA) MLD with multiple affiliated stations (STAs) according to a communication protocol (e.g., Institute of Electrical and Electronics Engineers (IEEE) IEEE 802.11be standard that sets protocols for Extra High Throughput (EHT) Wireless Local Area Networking (WLAN) of computer communications). The communication protocol defines a service set as a group of wireless network devices that are identified by the same service set identifier (i.e., the same network name) and Basic Service Sets (BSS) are subgroups of devices within a service set that are additionally operating with the same physical layer medium access characteristics (e.g., radio frequency, modulation scheme, security settings, etc.) such that they are wirelessly networked. Each AP MLD (i.e., multi-link AP entity) or STA MLD (i.e., multi-link STA entity) transmits or receives using one of a plurality of links or channels. Each link operates in one of a plurality of communication bands (i.e., frequency bands) having a center frequency (e.g., a fundamental frequency or a mean frequency of a 2.4 GHz band spanning 2.4 kHz to 2.4835 kHz). A link used to announce information in a management frame (e.g., Beacon frame) is referred to herein as the reporting (i.e., master) link. Other links associated with information reported in the reporting link are referred to herein as reported (i.e., slave) links. The AP related to the reporting link is referred to as the reporting AP or reporting entity of the multi-link AP entity. In some embodiments of the communication network, every link is used to transmit Beacon frames.

The embodiments of a communications network described below include features for multi-band operation and multi-BSSID capability, i.e., the capability to advertise information for multiple bands using a single management frame (e.g., a Beacon or Probe Response frame) instead of using multiple management frames (e.g., multiple Beacon or multiple Probe Response frames), each corresponding to a single band, and the capability to indicate buffered frames for these multiple bands using a single traffic indication map (TIM) element in a single Beacon frame or TIM frame. In embodiments that transmit Beacon frames using every link, a Reduced Neighbor Report (RNR) element that carries information associated with other bands or links to provide complete information of reported links that are not carried in the beacon frames of a reporting link, thereby decreasing management frame overhead.

Figure 1:
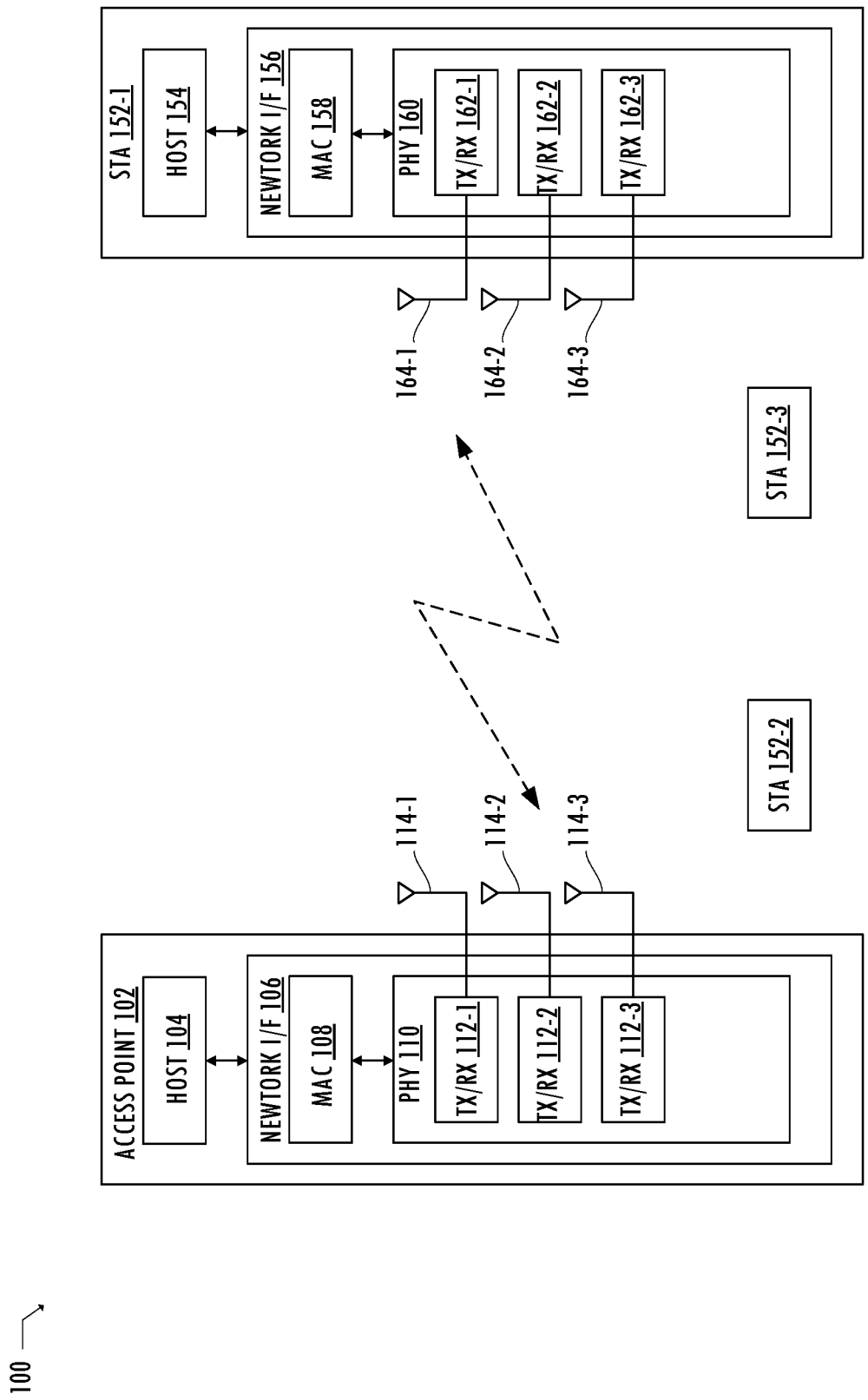
FIG. 1 illustrates a functional block diagram of an exemplary wireless communications network.

Referring to FIG. 1, communications network 100 includes AP MLD 102 and STA MLDs 152-1, 152-2, and 152-3. Although FIG. 1 illustrates three STA MLDs, other numbers of STA MLDs may be used. Access point 102 includes host processor 104 coupled to network interface 106. Host processor 104 includes a processor configured to execute machine readable instructions stored in a memory device (not shown), e.g., random access memory (RAM), read-only memory (ROM), a flash memory, or other storage device. Network interface 106 includes medium access control (MAC) processor 108, which, in at least one embodiment of a communications network, is part of a data link layer of an IEEE 802.11 standard-compliant access point, and physical layer (PHY) processor 110. AP MLD 102 is a multi-link AP entity, i.e., a multi-band device including multiple APs (e.g., including a common MAC layer and a lower MAC layer associated with transceiver 112-1, a lower MAC layer associated with transceiver 112-2, and a lower MAC layer associated with transceiver 112-3). In at least one embodiment of AP MLD 102, each AP entity is assigned a media access control (MAC) address, i.e., a unique identifier for use as a network address.

In general, the PHY is the first and lowest layer of the seven-layer Open Systems Interconnection (OSI) model of computer networking and includes electronic circuit transmission technologies of the network. In at least one embodiment of a communications network, MAC processor 108 or PHY processor 110 are configured to generate data units for wireless transmission and are configured to process received data units that conform to a communications protocol compliant with the IEEE 802.11 standard. For example, MAC processor 108 is configured to implement MAC layer functions, including MAC layer functions of the WLAN communications protocol and PHY processor 110 is configured to implement PHY protocol data units (PPDUs), MAC protocol data units (MPDUs), etc., and provides MAC layer data units to PHY processor 110. PHY processor 110 is configured to receive MAC layer data units from MAC processor 108 and to encapsulate those MAC layer data units to generate PPDUs (i.e., data units) for transmission via antennas 114-1, 114-2, and 114-3. PHY processor 110 provides the extracted MAC layer data units from each AP entity to MAC processor 108 for further processing.

In at least one embodiment of a communications network, PHY processor 110 includes a plurality of transceivers, each of which is coupled to a corresponding antenna of antennas 114-1, 114-2, and 114-3. Although three antennas and three transceivers are illustrated, other numbers of antennas and transceivers are used in other embodiments of a communications system. Each of transceivers 112-1, 112-2, and 112-3 includes a transmitter signal path and a receiver signal path, e.g., mixed-signal circuits, analog circuits, and digital signal processing circuits for implementing radio frequency and digital baseband functionality. PHY processor 110 includes at least one amplifier (e.g., low noise amplifier or power amplifier), data converter, and circuits that perform discrete Fourier transform (DFT), inverse discrete Fourier transform (IDFT), modulation, and demodulation. AP MLD 102 or STA MLDs 152-1, 152-2, or 152-3 generate and transmit data units that include training fields (e.g., data having predetermined values or characteristics) that are used by a receiver signal path to perform synchronization, perform gain control, and estimate channel characteristics for signal equalization. Client stations 152-1, 152-2, and 152-3 each include similar circuits (e.g., host processor 154, network interface 156, MAC processor 158, PHY processor 160, transceivers 162-1, 162-2, and 162-3 and antennas 164-1, 164-2, and 164-3) that provide similar functionality to that of corresponding elements in access point 102 but are adapted to mobile STA specifications.

In general, a Basic Service Set (BSS) refers to a subgroup of entities (e.g., multi-link AP entity, AP, or STA) that operate with the same physical layer medium access characteristics. BSSs are referred to as being co-located if the BSSs are implemented in the same physical network device. A STA learns about co-located BSSs by advertisement from the network device. For example, a network device periodically transmits Beacon frames to announce the presence of a wireless LAN and to synchronize members of the service set. The Beacon frames enable STAs within wireless range of the network device to establish or maintain a respective communication link. Alternatively, a STA transmits Probe Request frames on at least one channels and listens for Probe Response frames from the network device. The network device identifies or selects the STA to associate with and performs authentication and association operations to establish a wireless association with the STA. In at least one embodiment of a communications network, the Beacon frames include identification of a channel used, timing synchronization information, and are transmitted with a target Beacon transmission time (TBTT) measured in time units (e.g., 1024 microseconds). Multiple APs or multi-link AP entities may be used within the same geographical area to support large numbers of STAs or to distribute traffic among groups of STAs. A single network device may be configured to operate multiple APs or multi-link AP entities for multiple BSSs from the same network device. Each AP of a multi-link AP entity may be associated with a different BSS identifier (BSSID).

Figure 2:
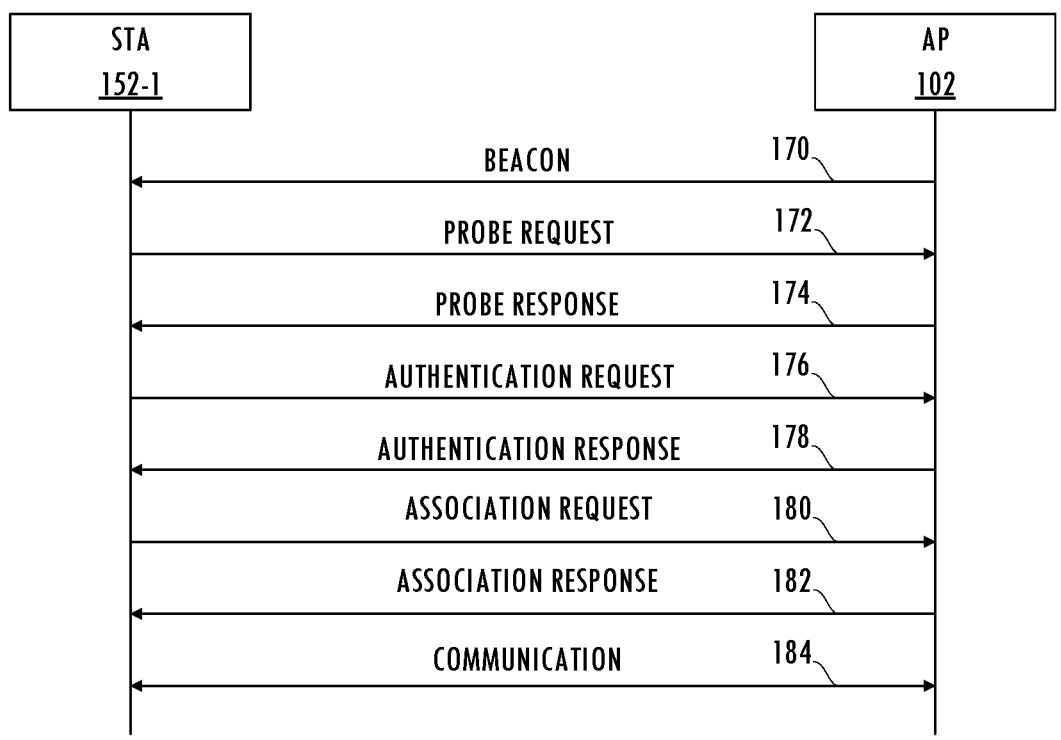
FIG. 2 illustrates an exemplary frame exchange for establishing communication between a mobile station and an access point in a wireless communications network.

FIG. 2 illustrates an exemplary technique for establishing association between STA MLD 152-1 and AP MLD 102 using management frame exchanges. STA MLD 152-1 discovers AP MLD 102 by passively monitoring Beacon frames 170 or by actively probing using Probe Request frame 172 and receiving Probe Response frame 174 from AP MLD 102. STA MLD 152-1 establishes its identity to AP MLD 102 by providing information in Authentication Request frame 176 and AP MLD 102 responds by transmitting Authentication Response frame 178. STA MLD 152-1 and AP MLD 102 establish a communication link via information exchange of Association Request frame 180 and Association Response frame 182. STA MLD 152-1 and AP use that communication link for communication 184.

A technique for decreasing management overhead of a communications network includes announcing information for multiple links using one management frame (e.g., one Beacon frame carrying a portion of the information for a reported link) or one pair of management frames (e.g., exchange of one Probe Request frame and Probe Response frame carrying full information for a reported link or exchange of one Association Request frame and one Association Response frame) that carries the information of more than one link. In general, a multi-link entity (e.g., multi-link AP entity or multi-link STA entity) can transmit management frames including information in multiple links. A link used to announce that information is referred to as a reporting link. A reported link is a link associated with information reported in another reporting link. For example, a Beacon frame transmitted in a reporting link (e.g., link L1) carries a portion of the information for a reported link (e.g., L2) or a unicast Probe Response frame transmitted in a reporting link (e.g., link L1) carries full information for a reported link (e.g., link L2).

In general, a multi-link STA or legacy (i.e., compliant with an earlier version of the 802.11 standard communication protocol) STA can associate with a multi-link AP entity via any link that transmits a Beacon frame. In at least one embodiment of a communications network, a multi-link AP entity has the same MAC address for all links. The multi-link STA entities and legacy STA associated with a multi-link AP entity in any link with the same BSSID. The service access point (SAP) in a multi-link AP entity for associated multi-link STA entities and associated legacy STAs are the same, i.e., SAP identified by BSSID. In other embodiments, a multi-link AP entity has different MAC addresses in its links. The multi-link STA entities associate with multi-link AP entity in different links with different BSSIDs. The SAP in multi-link AP entities for associated multi-link STA entities are the same, i.e., the SAP identified by BSSID.

In other embodiments, the multi-link STA entities associate with a multi-link AP entity in different links with different BSSIDs. The MAC address of a link of the multi-link AP is used as the BSSID. Thus, in at least one embodiment of a communications network, the MAC addresses in a management frame are translated to BSSID. Each multi-link entity has one SAP. Different multi-link entities have different SAPs. The BSSID for legacy STAs associated with multi-AP entity in different links are different. The SAP of a multi-link AP entity for associated multi-link STA entities and associated legacy STAs are different, i.e. the SAP is identified by various BSSIDs. The BSSID for legacy STAs associated with multi-AP entities in different links are different. The SAP in multi-link AP entities for associated multi-link STA entities and associated legacy STAs are different, i.e. SAP identified by various BSSIDs.

In at least one embodiment of a communications network, group-address frames for multi-link STA entities are transmitted in the reporting link of the corresponding multi-link STA entities. In another embodiment, group addressed frames for single link STAs are transmitted in the link where the single link STAs do association. Group addressed frames for legacy STAs are transmitted in the link where the legacy STAs do association.

In at least one embodiment of a communications network, after a link switch operation, a single link STA does not make any changes to its reporting link and the STA switches to a reporting link for the reception of group addressed frames. In another embodiment of the communications network, after a link switch operation, the STA changes its reporting link to the new link. The STA may not change pairwise keys; however, the group keys are the current group keys being used in the new link. The STA may renegotiate the new pairwise keys. The group keys are the current group keys being used in the new link.

In at least one embodiment of a communications network, after turning off operation of a reporting link, a multi-link STA entity may make no changes to its reporting link. The multi-link STA entity switches to the reporting link for the reception of the group addressed frames. In another embodiment of a communications network, after a link switch operation, the multi-link STA entity changes its reporting link to the new link. The pairwise keys are not changed. However, the group keys are the current group keys being used in the new link. In at least one embodiment of a communications network, the new pairwise keys are renegotiated. The group keys are the current group keys being used in the new link.

In at least one embodiment of a communications network, no Beacon frames are transmitted in a link, thus, another link where Beacon frames are transmitted announces the capabilities and operating parameters of the link (e.g. EDCA, MU EDCA, OFDMA random access parameters, Spatial Reuse parameters, BSS Operating Parameters etc.). If a multi-link AP entity transmits Beacons in link L1 of the multi-link AP entity and link L2 of the multi-link AP entity, the information for frame exchange of link L1, e.g. the capabilities, operating Parameters (EDCA, MU EDCA, OFDMA random access parameters, Spatial Reuse parameters, BSS Operating Parameters etc.) of link L1 are not announced in Beacon frames of link L2. The Beacon frames of link L2 announce a subset of information for receiving Beacons of link L1 that includes at least a critical operating parameter update announcement (e.g., a change sequence) of link L1 (e.g. the primary channel, bandwidth, TBTT of link L1). A new element or updating the current element, e.g. RNR, can be defined for announcement of information for frame exchange of link L1. For example, the RNR element carries information associated with link L1, thereby decreasing management frame overhead.

In at least one embodiment of a communications network, all links of the multi-link AP entity transmit Beacon frames. Beacon frames transmitted via a link do not announce all information for a frame exchange in another link where Beacon frames are transmitted. Beacon frames transmitted via a link announce a subset of the information used for receiving the Beacon frame in another link where Beacon frames are transmitted (e.g., at least the following parameters of another link that may include primary channel, BW, TBTT, critical events of the other link). A new element or updating the current element can be defined for announcement of the information for frame exchange in another link. For example, the RNR element carries information associated with other bands or links to provide complete information of reported links that are not carried in the beacon frames of a reporting link, thereby decreasing management frame overhead.

In at least one embodiment of a communications network, an Association Response frame includes capabilities and operating parameters of all links where the multi-link AP entity is working. Once the association is done, a multi-link STA entity knows the information for frame exchange in all of its links. The Association Request frame includes the capabilities and operating parameters of all links where the multi-link STA entity is working.

Referring to FIGS. 3A-3C, various network devices include multiple multi-link AP entities. Each multi-link AP entity supports multiple links using a corresponding lower-layer MAC, where each lower-layer MAC is an AP, and a common MAC. Each multi-link AP entity in a device can have different numbers of links and different reporting links or the same reporting links used to transmit the Beacon frames. Referring to FIG. 3A, network device 202 includes multi-link AP entity 217 having common MAC 218 and a lower-layer MAC supporting link L1 and a lower-layer MAC link supporting L2 using different frequency bands and being associated with distinct MAC addresses (e.g., MAC address ADDR11 and MAC address ADDR21, respectively, which are the BSSIDs of corresponding APs). Each multi-link AP entity identified by a MAC SAP address has one BSSID associated with each lower-level MAC of a reporting link. For example, multi-link AP entity 217 is identified by MAC address ADDR11, which is the MAC address of the reporting link associated with lower-layer MAC supporting link L1. MAC ADDR11 is the BSSID of the lower-layer MAC supporting link L1. MAC address ADDR21 is the BSSID of the lower-layer MAC supporting link L2. Multi-link AP entity 219 is identified by MAC address ADDR12, which corresponds to common MAC 220 and the lower-layer MAC supporting link L1. The AP with MAC address ADDR11 and the AP with MAC address ADDR12 form a co-located BSS. In at least one embodiment of a communications network, each AP of a co-located BSS transmits its own Beacon frame.

Referring to FIG. 3B, network device 204 includes multi-link AP entity 217 having common MAC 218 and a lower-layer MAC supporting link L1, a lower-layer MAC supporting link L2, and a lower-layer MAC supporting link L3 using different bands and associated with distinct MAC addresses (e.g., MAC address ADDR11, MAC address ADDR21, and MAC address ADDR31, respectively, which are BSSIDs of corresponding APs). Multi-link AP entity 217 is identified by ADDR11, which is the MAC address of link L1. However, multi-link AP entity can be identified by an address that is different from addresses of the links of the multi-link AP entity. Multi-link AP entity 219 includes common MAC 220 and a lower-layer MAC for each of link L1 and link L2. Each link uses a different band and is associated with a distinct MAC address (MAC address ADDR12 and MAC address ADDR22, respectively). Multi-link AP entity 219 is identified by MAC address ADDR12, which is the MAC address associated with the reporting link of multi-link AP entity 219. The AP with MAC address ADDR11 and the AP with MAC address ADDR12 form a co-located BSS.

Referring to FIG. 3C, network device 206 includes multi-link AP entity 217 having common MAC 218 and lower-layer MACs supporting link L1, link L2, and link L3, each using different frequency bands and being associated with MAC addresses ADDR11, ADDR21, and ADDR31, respectively. Multi-link AP entity 217 is identified by MAC address ADDR11, which is the MAC address of lower-layer MAC associated with reporting link of multi-link AP entity 217. Multi-link AP entity 219 includes common MAC 220 and lower-layer MACs supporting link L1 and link L2, each using different frequency bands and being associated with MAC addresses ADDR12 and ADDR22, respectively. Multi-link AP entity 219 is identified by MAC address ADDR12, which is the MAC address associated with the reporting link of multi-link AP entity 219. Multi-link AP entity 221 includes common MAC 222 and lower-layer MAC associated with MAC address ADDR24, and lower-layer MAC associated with MAC address ADDR34, each using different bands. Multi-link AP entity 221 is identified by MAC address ADDR24, which is the MAC address associated with the reporting link of multi-link AP entity 221. Multi-link AP entity 223 has a common MAC 224 and lower-layer MACs supporting link L1 and link L3, each using different bands and associated with MAC addresses ADDR13 and ADDR33, respectively. Multi-link AP entity 223 is identified by MAC address ADDR33, which is the MAC address associated with the reporting link of multi-link AP entity 223. Multi-link AP entities 217 and 219 form a co-located BSS using the same band (e.g., link L1) for association with STA entities with different numbers of links. In some embodiments of a communications network, multi-link AP entities 221 and 223 use different bands and different links for association with STA entities with different numbers of links (e.g., link L2 and link L3, respectively). In other embodiments of a communications network, a STA uses any link of multi-link AP entities 221 and 223 for association. A legacy STA uses one AP affiliated with a multi-link AP entity for association. A multi-link STA entity does multi-link association with a multi-link AP entity. In network device 206, each multi-link AP entity advertises information associated with each multi-link AP entity of network device 206 (e.g., ADDR11, ADDR12, ADDR24, and ADDR33) using at least one management frame for each multi-link AP entity, which is associated with substantial latency and substantial power consumption.

Figure 4:
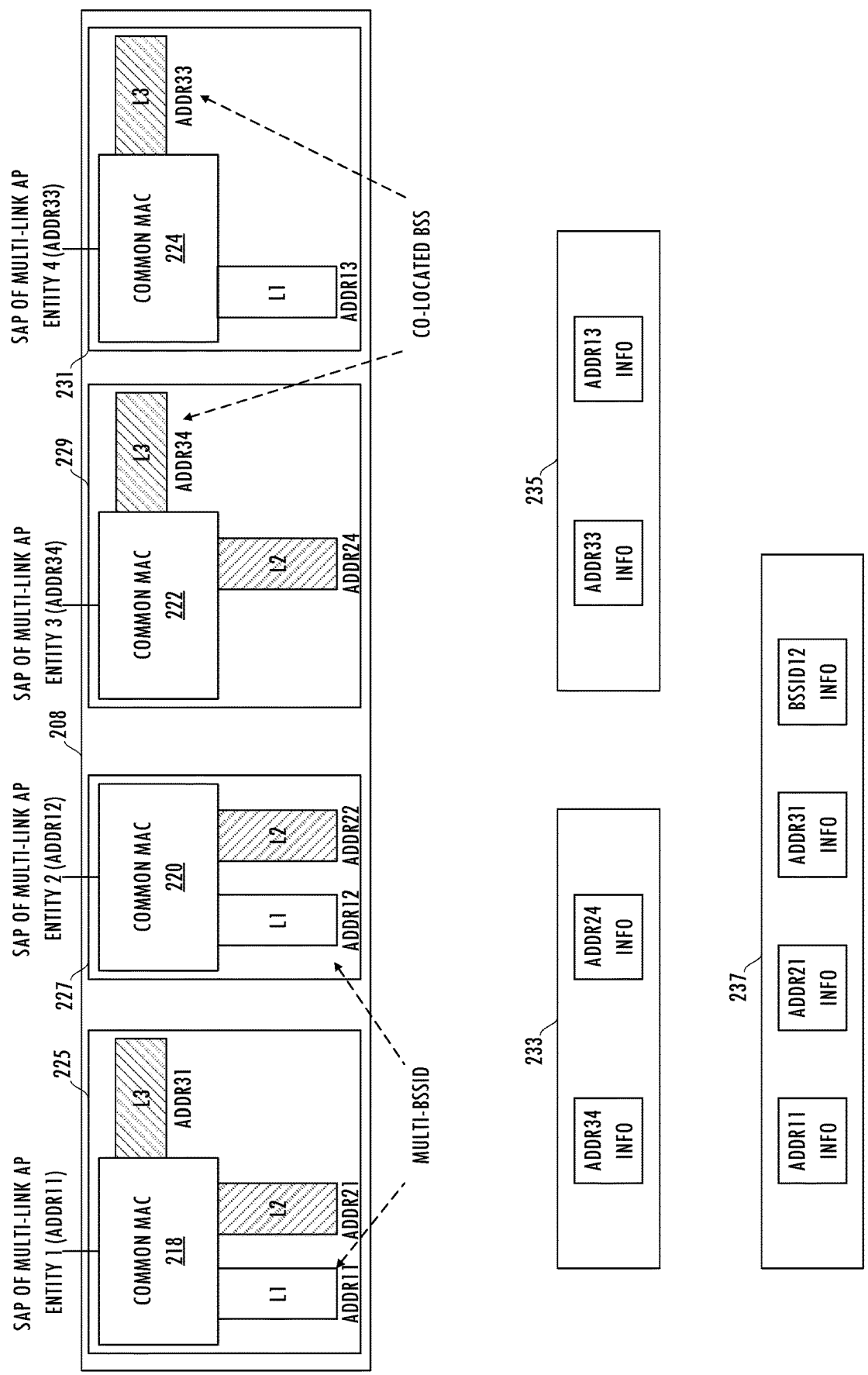
FIG. 4 illustrates a functional block diagram of an exemplary multi-band device including multiple basic service sets for a wireless communications network and associated Beacon frames consistent with at least one embodiment of the invention.

A technique for further decreasing management overhead of a communications network includes announcing information for multiple BSSID among multiple bands using one management frame (e.g., one Beacon frame) or one pair of management frames (e.g., one Probe Request frame and Probe Response frame exchange or Association Request frame and one Association Response frame exchanges for multi-link association by multi-link STA entities with multi-link AP entities) that carries the information of more than one band. The technique reduces the number of management frames needed to announce information in a network device to advertise information associated with a set of multiple APs defined by a multi-BSSID feature using a single management frame (e.g., a Beacon frame or a Probe Response frame) instead of using multiple management frames. Rather than advertise information for each BSSID using multiple management frames, as performed by network device 206, an AP affiliated with a multi-link AP entity implementing the multi-BSSID feature advertises information for a multi-BSSID set using one management frame or one pair of management frames. A multi-BSSID set refers to the APs with non-transmitted BSSIDs that are affiliated with multiple multi-link entities that are announced by the single management frame. That is, the management frame carries information for each AP associated with a non-transmitted BSSID in the reporting link and the multi-link AP entity information corresponding to the AP associated with the non-transmitted BSSID. Referring to FIG. 4, multi-link AP entity 225 includes an AP associated with MAC address ADDR11. Since the AP associated with MAC address ADDR11 transmits the management frame and multi-link AP entity 227 includes an AP that corresponds to a non-transmitted BSSID of the multi-BSSID element, the AP associated with MAC address ADDR11 announces information for all links of multi-link AP entity 225 and multi-link AP entity 227 that form a multi-BSSID set of network device 208. Multi-link AP entity 229 and multi-link AP entity 231, which have a common link (e.g., link L3), form a co-located BSSID that are not included in the multi-BSSID set. A management frame transmitted by an AP of multi-link AP entity 229 carries information associated with multi-link AP entity 229. The management frame transmitted by an AP of multi-link AP entity 231 carries information associated with multi-link AP entity 231. In general, a legacy STA entity associates with an AP of a multi-link AP entity via one of the reporting links of the multi-link AP. A multi-link STA entity uses one of the reporting links of the multi-link station for multi-link association with a multi-link AP entity. Thus, a STA MLD can acquire information for all APs of an AP MLD defined by a multi-BSSID set using only one link.

Beacon frame 233, which is transmitted by the AP associated with MAC address ADDR34 that is affiliated with multi-link AP entity 229, communicates information for multi-link AP entity 229 including capability and operation parameters of the AP associated with MAC address ADDR34, and a subset of information of the AP associated with MAC address ADDR24 (e.g., in an RNR element of the Beacon frame). The operation parameters for MAC address ADDR34 include an indication of a co-located BSS (e.g., a co-located BSSID announcement in a High-Efficiency (HE) operation element of IEEE 802.11ax standard communication protocol). In at least one embodiment, Beacon frame 233 includes simplified information for the AP associated with MAC address ADDR24 (e.g., in an RNR element of the Beacon frame) where the AP with MAC address ADDR24 and the AP with MAC address ADDR34 are affiliated with AP MLD 229. In at least one embodiment, Beacon frame 233 includes capability and operation parameters for MAC address ADDR24.

Beacon frame 235, which is transmitted by the AP associated with MAC address ADDR33 that is affiliated with multi-link AP entity 231, communicates information for multi-link AP entity 231 including capability and operation parameters of the AP associated with MAC address ADDR33, and a subset of information of the AP associated with MAC address ADDR13 (e.g., in an RNR element of the Beacon frame), where the AP with MAC address ADDR13 and the AP with MAC address ADDR33 are affiliated with AP MLD 231. The operation parameters for MAC address ADDR33 include an indication of co-located BSSID (e.g., a co-located BSSID announcement in a HE operation element). In one embodiment, Beacon frame 235 includes simplified information for the AP associated with MAC address ADDR13 (e.g., in an RNR element of the Beacon frame). In at least one embodiment, Beacon frame 235 includes capability and operation parameters for MAC address ADDR13.

An AP of multi-link AP entity 225 that is affiliated with a transmitted BSSID, e.g., the AP associated with MAC address ADDR11, transmits a management frame, e.g., Beacon frame 237, a Probe Response frame, or Association Response frame, which communicates the information for APs affiliated with multi-link AP entity 225, which is the multi-link AP entity with which the reporting AP with BSSID of ADDR11 is affiliated. In at least one embodiment, that information includes capability and operation parameters for the AP associated with MAC address ADDR11, and a subset of information for the reported APs (e.g., the APs associated with MAC address ADDR21 and ADDR31) in reported links. In at least one embodiment, that information includes capability and operation parameters for each MAC address of multi-link AP entity 225 (e.g., MAC addresses ADDR11, ADDR21, and ADDR31) with which the management frame transmitter is affiliated, e.g., in an Association Response frame. In addition, the management frame, e.g., Beacon frame 237, a Probe Response frame, or Association Response frame includes information for multi-link AP entities with which the non-transmitted BSSID APs of the multi-BSSID set are affiliated: 1) the information for APs with non-transmitted BISSDs defined by a multi-BSSID element, e.g., information for the AP associated with MAC address ADDR12, 2) the information for the other APs of multi-link AP entities with which the non-transmitted BSSID APs of the multi-BSSID set are affiliated (e.g., APs associated with MAC address ADDR22). That information includes information for multi-link AP entity 227. In at least one embodiment, that information includes capability and operation parameters for the AP associated with MAC address ADDR12 and a subset of information (e.g., in an RNR element of the Beacon frame) for the AP associated with MAC address ADDR22. In at least one embodiment, the information for the multi-link AP entity having an affiliated AP that is defined by a multi-BSSID element includes capability and operation parameters for the AP associated with MAC address ADDR12 and the AP associated with MAC address ADDR22. In at least one embodiment of a communications network, APs that implement a multi-BSSID element and are affiliated with the same multi-link AP entity transmit Beacon frames using any of the links (e.g., link L1, link L2, or link L3). In at least one embodiment of a communications network, APs that implement a multi-BSSID element transmit Beacon frames in all of the links (e.g., link L1, link L2, and link L3), each having a different MAC address.

In at least one embodiment of a communications network, a multi-link AP entity does not announce the capability and operation parameters of a reported AP entity affiliated with another multi-link AP entity except for when the multi-link AP entity for the reported AP is announced in a multi-BSSID element, where the reporting AP has the transmitted BSSID of the multi-BSSID element. If a multi-BSSID element announces the multi-link AP entity of the reported AP, then the reported AP and associated capability and operating parameters are announced in the multi-BSSID element. For example, the multi-link AP entity associated with MAC address ADDR12 is a reported AP of a multi-BSSID element associated with MAC address ADDR11. Thus, Beacon frame 237 includes capability and operation parameters for APs associated with MAC addresses ADDR11, ADDR21, ADDR31, and ADDR12.

In at least one embodiment of a communications network, if a multi-link AP entity transmits a Beacon frame via a reporting link including the capabilities and operating parameters of a reporting AP and a subset of information (e.g., in an RNR element of Beacon frame) its affiliated reported APs, the subset of the information (e.g., RNR information) of the APs associated with them via multi-BSSID features are also included in the Beacon frame. For example, Beacon frame 237 includes the capabilities and operating parameters of APs associated with MAC addresses ADDR11, ADDR12, and RNR information of ADDR21, ADDR31, and ADDR22.

Figure 5:
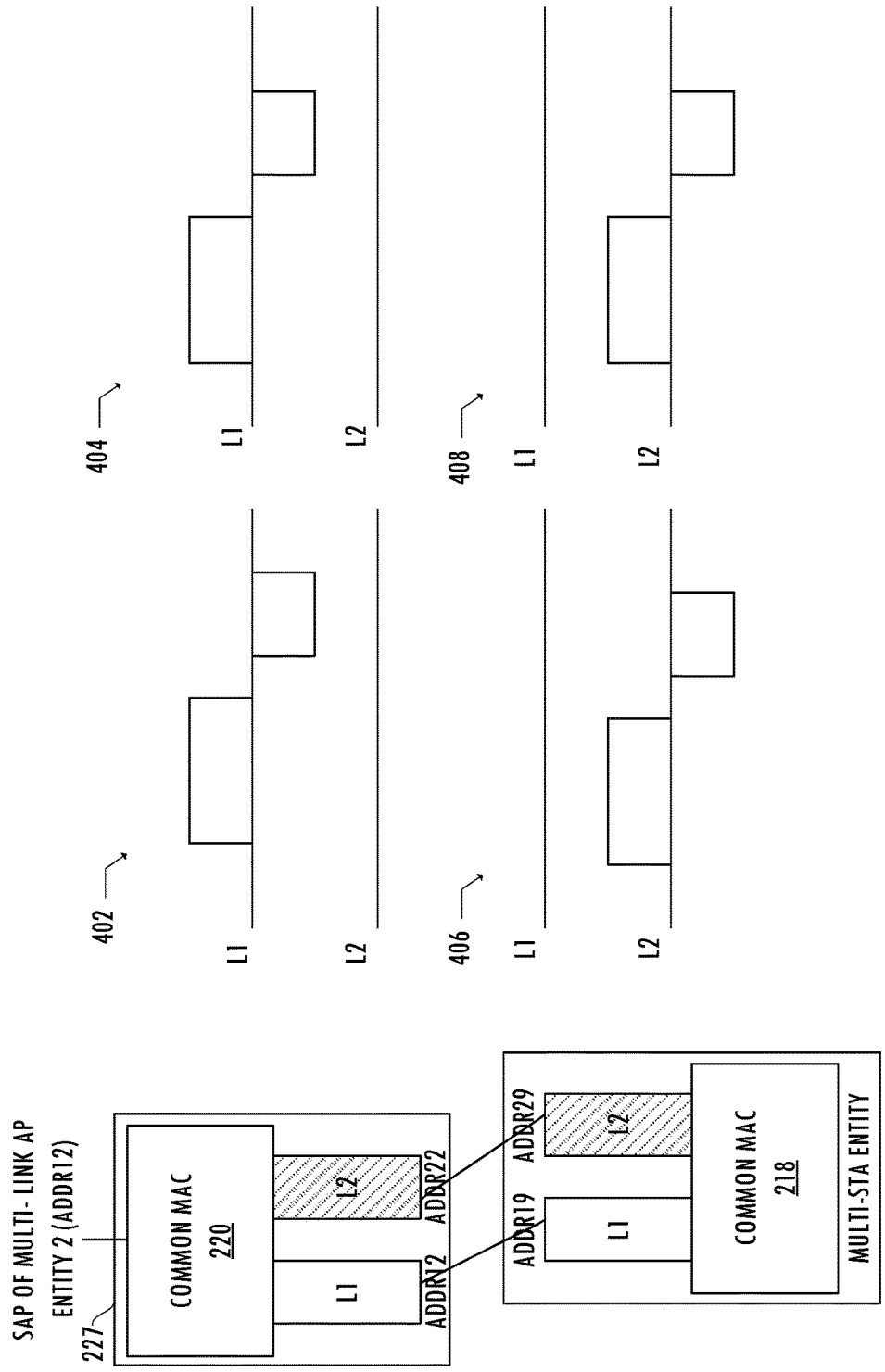
FIG. 5 illustrates a functional block diagram of an exemplary multi-band access point associated with a multi-band station and associated communications for an operation mode change consistent with at least one embodiment of the invention.

Referring to FIG. 5, in at least one embodiment of a communications network, a multi-link AP entity or multi-link STA entity changes the operation mode of any of its links via the reporting link. An exemplary operation mode change includes a link ID and an updated parameter (e.g., updated bandwidth, updated transmit/receive number of spatial streams ($N_{SS}$), or updated number of space-time streams ($N_{STS}$)). In an exemplary operating mode change notification, a soliciting frame and a responding frame are in PPDUs having the same bandwidth. After the frame exchange, the new bandwidth is used. For example, the bandwidth of the soliciting frame and the responding frame are in PPDUs with an 80 MHz bandwidth; future frame exchanges use a 40 MHz bandwidth. If link L1 is the reporting link, multi-link AP entity 227 changes the bandwidth of link L1 from 80 MHz to 40 MHz via a frame exchange using link L1 (402) or changes the bandwidth of link L2 from 80 MHz to 40 MHz via a frame exchange using link L1 (404). In at least one embodiment of a communications network, a multi-link AP entity or multi-link STA entity changes the operation mode of a link via a frame exchange using the link to be changed. For example, if link L1 is the reporting link, multi-link AP entity 227 changes the bandwidth of link L2 from 80 MHz to 40 MHz via a frame exchange using link L2 (406). In other embodiments, a multi-link AP entity or multi-link STA entity changes the operation mode of any link via a frame exchange using any link. For example, if link L1 is the reporting link, multi-link AP entity 227 can change the bandwidth of link L1 from 80 MHz to 40 MHz via a frame exchange using link L2 (408).

Figure 6:
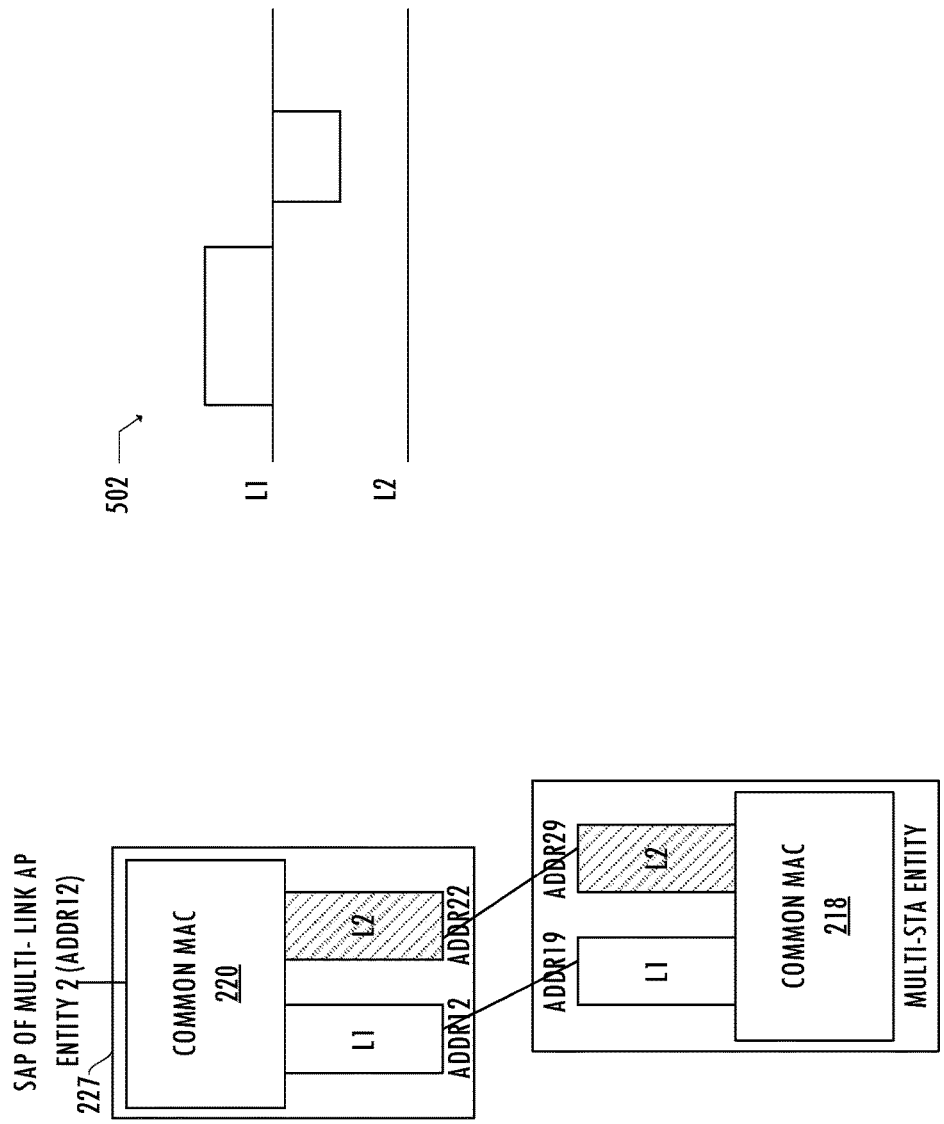
FIG. 6 illustrates a functional block diagram of an exemplary multi-band access point associated with a multi-band mobile station and associated communication for an operation mode change consistent with at least one embodiment of the invention.

Referring to FIG. 6, in at least one embodiment of a communications network, one operation mode change announcement applies only to a single link of a multi-link entity. For example, if multi-link AP entity 227 changes the bandwidth of link L1 from 80 MHz to 40 MHz via link L1 (502), the change applies only to link L1. In other embodiments of the communications network, one operation mode change announcement announces changes to multiple links of a multi-link entity. For example, if multi-link AP entity 227 announces a bandwidth change from 80 MHz to 40 MHz via link L1, the change applies to both link L1 and link L2.

In at least one embodiment of a communications network, a multi-link AP entity or multi-link STA entity can enable or disable a link only via a reporting link. In other embodiments of the communications network, a multi-link AP entity or multi-link STA entity can enable or disable a link via any active link. In at least one embodiment of a communications network, a multi-link AP entity or multi-link STA entity enables or disables a link only via the link being enabled or disabled. In yet other embodiments of the communications network, a multi-link AP entity or multi-link STA entity enables or disables a link via a reporting link, if the reporting link is active at the multi-link STA entity. Otherwise, the multi-link AP entity or the multi-link STA entity can enable or disable the link via any active link. Note that the reporting link at a multi-link AP entity is always active. The announcement enabling or disabling a link may include a target time of the enabling or disabling. The corresponding multi-link entity enables or disables the link after the announced target time. In at least one embodiment of the communications network, the announcement includes an indication about whether the announced link can be used after the announcement enabling or disabling the link.

In at least one embodiment of a communications network, a multi-link AP entity or multi-link STA entity transfers its working link for related traffic identifiers (TIDs) from link L1 to link L2 (for some or all TIDs in link L1) via a reporting link. The TIDs are any of the identifiers usable by higher layer entities to distinguish MAC service data units (MSDUs) to MAC entities that support quality of service within the MAC data service. In at least one embodiment of a communications network, a multi-link AP or multi-link STA transfers its working link for related TIDs from link L1 to link L2 (for some or whole TIDs in link L1) via link L1 only. In at least one embodiment of a communications network, a multi-link AP entity or multi-link STA entity transfers its working link for related TIDs from link L1 to link L2 (for some or whole TIDs in link L1) via any active link. In at least one embodiment of a communications network, a multi-link AP or multi-link STA transfers its working link for related TIDs from link L1 to link L2 (for some or whole TIDs in link L1) if the reporting link at the multi-link STA is active. Otherwise, a multi-link AP or multi-link STA entity transfers its working link from link L1 to link L2 (for some or whole TIDs in link L1) via link L1 or any active link. The reporting link at a multi-link AP entity is always active.

In at least one embodiment of the communications network, TID transfer between links occurs via notification (e.g., TID transfer announcement and acknowledgement). The TID transfer announcement includes the target time of the transfer. The target link can be used after the announced target time. The message of the TID transfer announcement carries an indication about whether the original link can be used after the announcement of the TID transfer. In at least one embodiment of a communications network, TID transfer via notification includes a TID transfer announcement and acknowledgement and a TID transfer response and acknowledgement. The message of the TID transfer announcement includes an announcement of the maximal time of transfer. If the request is accepted, the target link can be used after the maximal time of transmitting the TID transfer response. If the request is accepted, the message of the TID transfer announcement carries an indication about whether the original link can be used after transmitting TID transfer response.

In at least one embodiment of the communication protocol, a multi-link STA entity and a reporting AP entity exchange management frames via a reporting link. In other embodiments of the communication protocol, the multi-link STA entity and the multi-link AP entity exchange management frames except for Beacon frames and frames for (re)association link or TID transfer via any link. In still other embodiments of the communication protocol, a multi-link STA entity and a reporting AP entity exchange management frames via a reporting link if the reporting link is active at the multi-link STA entity. Otherwise, the multi-link STA entity and the multi-link AP entity exchange management frames via any active link. In at least one embodiment of the communication protocol, the multi-link AP entity indicates the link for management frame transmission, or the multi-link AP entity and the multi-link STA entity negotiate the link for management frame transmission.

In at least one embodiment of the communication protocol, the multi-link AP entity or the multi-link STA entity transmits management frames in a fixed link only, e.g., in a reporting link. In at least one embodiment of the communication protocol, the multi-link AP entity or the multi-link STA entity transmits the management frames in any active link of the multi-link AP entity or the multi-link STA entity.

In at least one embodiment of the communication protocol, a multi-link STA entity communicates only using a reported link. A STA device having a single radio communicates using a reported link after a link switch. Some TIDs of a multi-link entity are restricted to a reported link. In order to avoid switching a multi-link STA entity to a reporting link for receiving TIM, BSS operation parameters, and TIM, the BSS operation parameters are transmitted in a reported link. The TIM frame can be transmitted in a reported link. The TIM in a reported link announces the buffered frames that are only transmitted in a reported link. The TIM in a reporting link announces the buffer frames that can be transmitted in any link or in the reporting link. A management frame including TIM, timing synchronization function (TSF) time, or operation parameters can be transmitted in a reported link. A Beacon frame or Probe Response frame in EHT PPDU can be transmitted in a reported link. The transmitted frame indicates that the reported link is used to avoid association via the reported link. That frame is transmitted periodically, e.g., in target beacon transmission time (TBTT) that is the same as TBTT in a reporting link, target TIM transmission time (TTTT), or another period.

Figure 7:
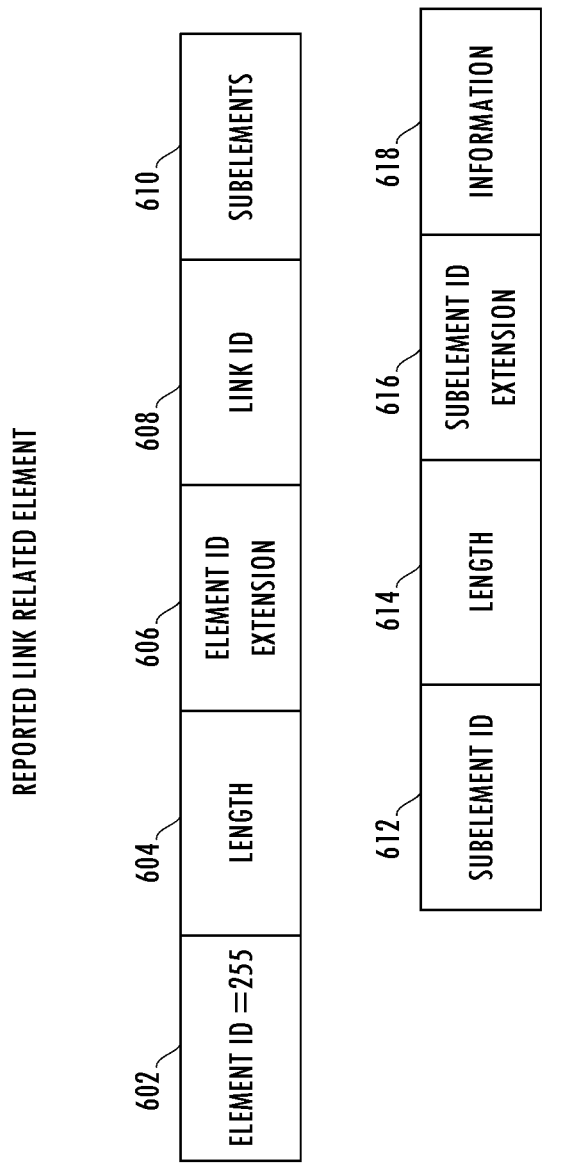
FIG. 7 illustrates exemplary management frame elements for announcing capability and operation parameters for a reported link consistent with at least one embodiment of the invention.

In at least one embodiment of the communications network, a multi-link AP entity or multi-link STA entity has different capabilities in different links. A multi-link AP entity may announce different operating parameters for different links. Elements without a link indication are elements announced for the reporting link. An element can be applied to a reported link only if the element has a link identifier to indicate the reported link. An exemplary reported link element format is illustrated in FIG. 7. If element identifier 602 has a maximum value (e.g., 255), then an element ID extension is present. Length 604 indicates the length of the element. Element ID extension 606 indicates a reported link related information element. Link ID 608 identifies the link. Subelements 610 includes one or more subelements. An exemplary subelement includes subelement identifier 612, length 614, subelement identifier extension 616, and other information 618. Subelement identifier 612 is the same as element identifier 602 for the same information format, e.g., an enhanced distributed channel access (EDCA) parameter set subelement has the same value as element identifier 602 of the EDCA parameter set element.

Figure 8:
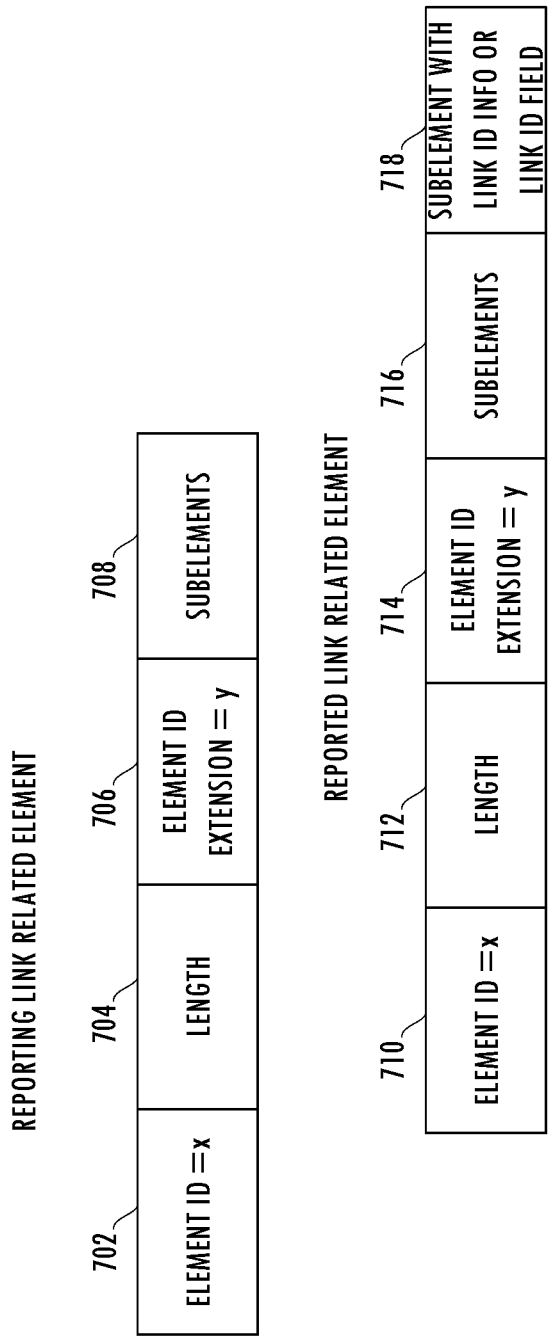
FIG. 8 illustrates other exemplary management frame elements for announcing capability and operation parameters of a reporting link and a reported link consistent with at least one embodiment of the invention.

FIG. 8 illustrates a normal link element format and another exemplary reported link element format that includes capability and operation parameters of the reported link, which is not applicable to TIM, supported rates, and BSS Membership selectors or other non-extendable elements. The normal link format includes element ID 702 and element ID extension 706, if it exists, in addition to length 704 and subelements 708. A reported link related element includes element identifier 710, length 712, element identifier extension 714, subelements 716, and a subelement with link identifier information or link ID field 718. By default, if no subelement is in a reported link related element having a subelement identifier (and subelement identifier extension, if it exists) that is the same as the element identifier (and element identifier extension, if it exists, respectively) of an element in a Beacon, Probe Request, Probe Response, (re)Association Request, or (re)Association Response frame, then that element applies to the reporting link and the reported link.

Figure 9:
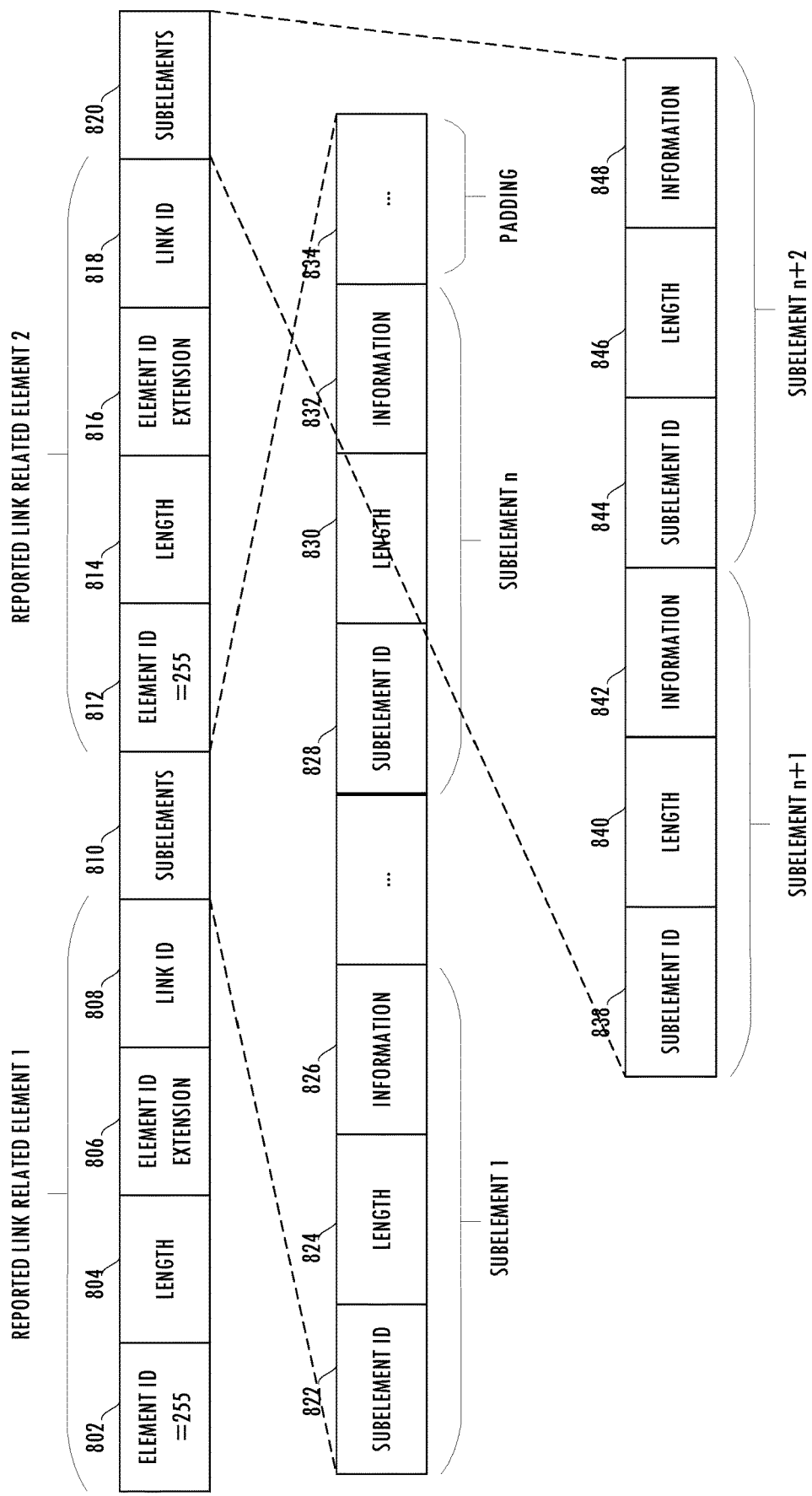
FIG. 9 illustrates exemplary management frame elements for announcing capability and operation parameters of multiple reported links consistent with at least one embodiment of the invention.

FIG. 9 illustrates reported link related elements and subelements. In at least one embodiment of a communications network, when using multiple reported link related elements to carry a subelement, the subelement must not be carried by more than one reported link related element, i.e., subelements cannot be fragmented. If a subelement fits in the current reported link related elements, i.e., if, after aggregating the subelement, the reported link related element is not more than the maximal length indicated by the corresponding length field, then the subelement cannot be put in a new reported link related element. Reported link related element 1 includes common information that is shared with each of subelements 810, e.g., element ID 802, length 804, element ID extension 806, and link ID 808 are common information that is shared with subelements 810. A link ID indicates the link identifier and whether the link is a reporting link or a reported link. Each of subelements 810 includes information unique to the subelement, e.g., subelement 1 includes subelement ID 822, length 824, and information 826, and subelement n includes subelement ID 828, length 830, and information 832. In at least one embodiment of a communications network, subelement ID is the same as the element ID for the same information format (e.g., EDCA parameter set subelement has the same value as element ID of EDCA parameter set element). In at least one embodiment of a communications network, padding bits 834 (e.g., 4 octets for a 255 octet subelements portion) are included where appropriate to achieve a predetermined number of bits in the element. Reported link related element 2 includes common information that is shared with subelements 820. For example, element ID 812, length 814, element ID extension 816, and link ID 818 are common information that is shared with each of subelements 820. Each of subelements 820 includes information unique to that subelement. For example, subelement n+1 includes subelement ID 838, length 840, and information 842 and subelement n+2 includes subelement ID 844, length 846, and information 848.

Figure 10:
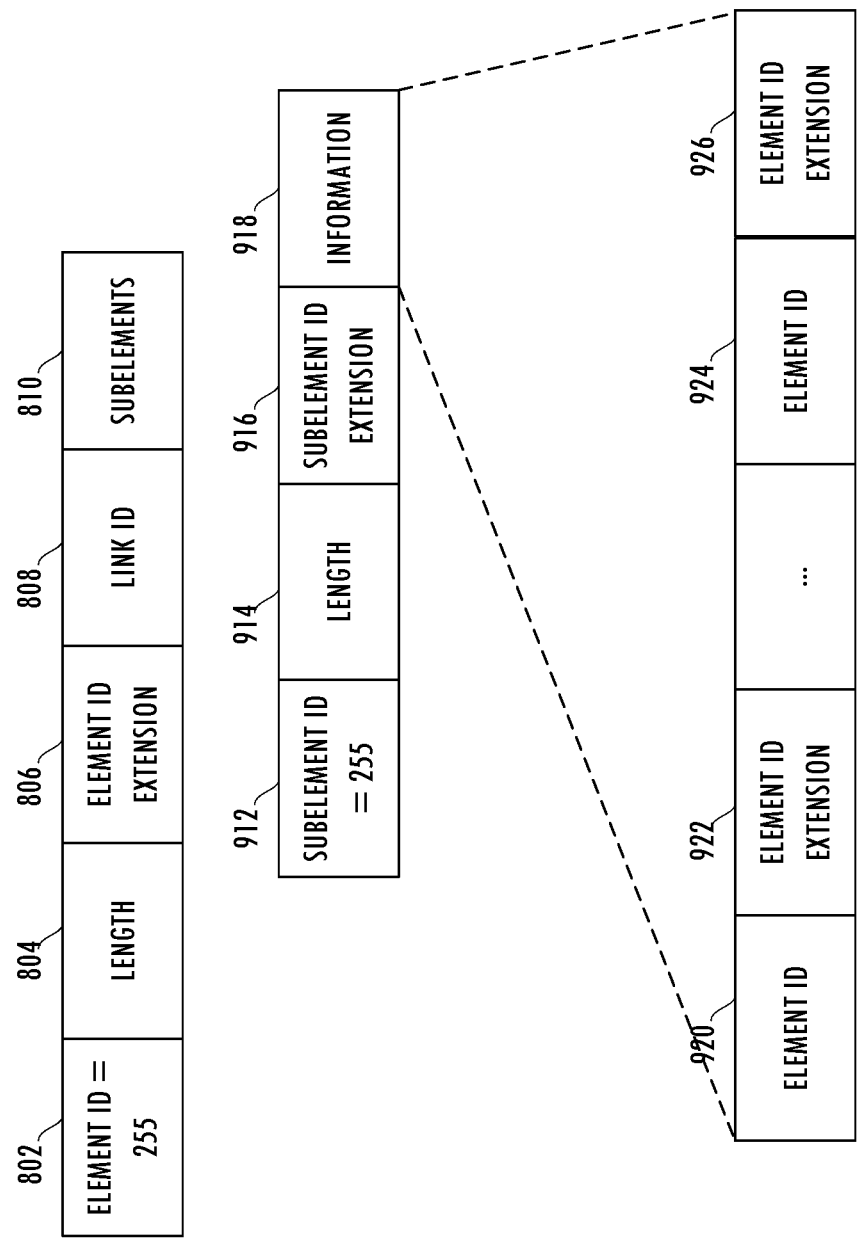
FIG. 10 illustrates other exemplary management frame subelements for announcing capability and operation parameters of a reported link consistent with at least one embodiment of the invention.

Referring to FIG. 10, in at least one embodiment of a communications network, if the information of a reported link is not explicitly announced, the information of the reporting link is applied to the reported link by default, i.e., if a field is not defined in a reported link related element, then the reported link related element inherits the definition of a corresponding element of a reporting link. In at least one embodiment of the communications network, default inheritance of information may be overruled by explicitly announcing an uninherit element ID. In at least one embodiment of the communications network, inheritance is selectively determined by an uninherited element subelement (e.g., having a subelement ID 912, length 914, and subelement ID extension 916 corresponding to the uninherit element subelement). If an element ID and element ID extension exist in information 918 of the uninherit element subelement of a reported link, then the element identified by that element ID and element ID extension is not inherited by the reported link. In an embodiment of a communications network, element ID 920 and element ID 924 are one octet each and element ID extension 922 and element ID extension 926 are zero octets (not present and no uninheritance) or one octet each, although other widths may be used.

Figure 11:
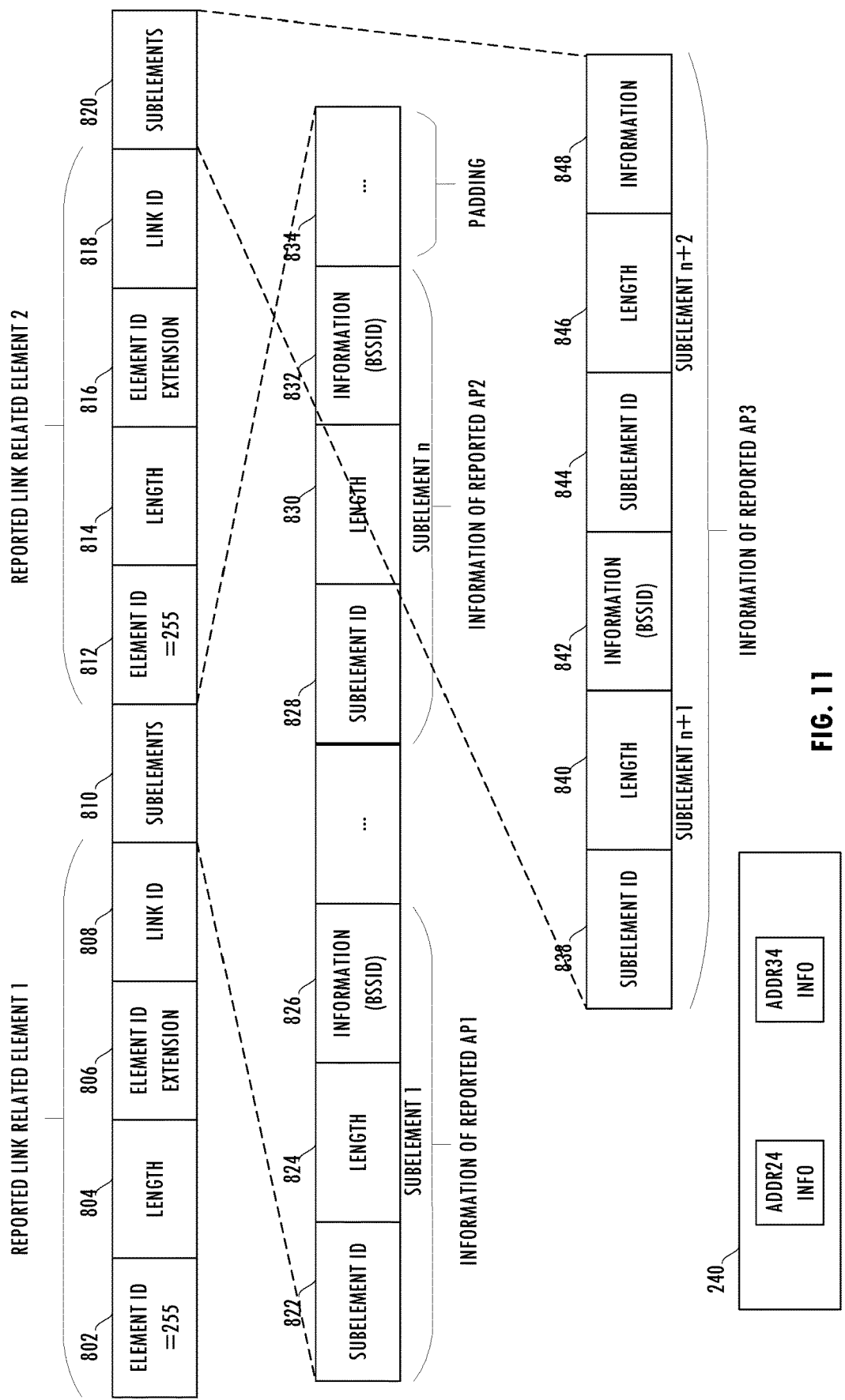
FIG. 11 illustrates other exemplary management frame subelements for announcing capability and operation parameters of multiple reported links consistent with at least one embodiment of the invention.

Referring to FIGS. 4 and 11, in at least one embodiment of a communications network, a non-transmitted BSSID has the same reporting/reported link relationship roles as a transmitted BSSID. In an embodiment, the information for the reported AP affiliated with the same AP MLD as the reporting AP can use an inheritance technique similar to inheritance implemented in the IEEE 802.11ax standard communication protocol. A reported AP that is affiliated with the same AP MLD as the reporting AP inherits an element from the reporting AP if the ID of the element is not in the reported AP entity's reported link related element. If more than one reported AP is allowed in a link, the subelements of each reported AP is identified by a specific element, e.g., BSSID subelement or another subelement. For example, Subelement 1 includes information for reported AP1. Subelement n includes information for reported AP2, and subelements n+1 and n+2 include information for reported AP3. A reported AP inherits an element from the reporting AP if the ID of the element is not in the reported APs reported link related element. A reported AP affiliated with a non-transmitted BSSID in a reported link inherits the elements of a reported AP affiliated with the transmitted BSSID. The inherited element IDs are the same as the inherited element IDs of a non-transmitted BSSID from transmitted BSSID unless the uninherited element disallows it. For example, if ADDR12 is a non-transmitted BSSID, the AP associated with MAC address ADDR12 inherits from the AP associated with MAC address ADDR11. In another example, the AP associated with MAC address ADDR22 is a reported AP and inherits from the AP associated with MAC address ADDR12.

In at least one embodiment of a communications network, a non-transmitted BSSID can have a different reporting/reported roles than a transmitted BSSID. For example, a reported AP (e.g., AP associated with MAC address ADDR34) inherits an element from a reporting AP if the ID of the element is not in reported the APs reported link related element. A link element related to the AP associated with MAC address ADDR34 encapsulates information related to that AP. The link ID of a link element indicates a reported link. If more than one reported AP in a link is allowed, the subelements of each reported AP is identified by a specific element, e.g., BSSID subelement or other identifier. For example, Beacon frame 240 transmitted by the AP associated with MAC address ADDR24, includes capability and operation parameters for the AP associated with MAC address ADDR24 and capability and operation parameters for the AP associated with MAC address ADDR34.

In at least one embodiment of a communications network, a reported AP inherits an element from the reporting AP if the ID of the element is not in the reported APs reported link related element. A reported AP affiliated with a non-transmitted BSSID in a reported link inherits the reported AP affiliated with the transmitted BSSID. The inherited element IDs are the same as the inherited element IDs of the non-transmitted BSSID from the transmitted BSSID unless the uninherited element disallows it. For example, referring to Beacon frame 237 of FIG. 4, the element IDs of the AP associated with MAC address ADDR21 inherited from the AP associated with MAC address ADDR22 are the same as the element IDs for the AP associated with MAC address ADDR22.

In at least one embodiment, a method for operating a wireless communications network includes transmitting a management frame by a first multi-link entity of a set of entities using a reporting link associated with a first network identifier and a first communication band. The management frame includes first information associated with the first multi-link entity and second information associated with a second link of the set of entities. The second link is associated with a second network identifier. The first information may include capability or operation parameter information for the reporting link and the second information includes second capability or operation parameter information for the second link. The second link may be associated with the first multi-link entity. The first information may include capability or operation parameter information for a first plurality of links of the multi-link entity and the second information may include second capability or operation parameter information for the second link. The second link may be associated with a second entity of the set of entities.

The second entity may be a second multi-link entity and the second information may include operation parameters for each link of the second multi-link entity. The method may further include changing an operation mode of the reporting link using the reporting link of the first multi-link entity. The method may further include changing an operation mode of the reporting link using any link of the first multi-link entity. The method may further include enabling or disabling the reporting link by the first multi-link entity using any active link of the first multi-link entity. The method may further include enabling or disabling the reporting link by the first multi-link entity using the reporting link. The method may further include inheriting third information for an element of the second link from a corresponding element of the first information in the absence of the element in the second information. The method may further include selectively inheriting third information for an element of the second link from a corresponding element of the first information in the absence of the element in the second information and based on an indication for uninheritance.

The management frame may be a beacon frame and may be transmitted by the first multi-link entity using the reporting link and using a third link of the first multi-link entity. The reporting link may use the first communication band and the third link may use a second communication band. The management frame may be transmitted using all links of the first multi-link entity. In the reporting link, the management frame may include third information for receiving other management frames using the second link of the first multi-link entity. The method may further include transferring traffic identifiers between links of the first multi-link entity using a traffic identifier transfer announcement and acknowledgement frames. The method may further include transferring traffic identifiers between links of the first multi-link entity using negotiation including traffic identifier transfer request and acknowledgement and traffic identifier transfer response and acknowledgement frames. The management frame may be a beacon frame and the method may further include transmitting other management frames by the first multi-link entity using any active link of the first multi-link entity. The second link may be affiliated with a second reporting link and the management frame includes third information associated with the second reporting link.

In at least one embodiment of a communications network, an apparatus includes a multi-link entity having a medium access controller, a first radio coupled to the medium access controller and a second radio coupled to the medium access controller. The first radio has a first network identifier and is associated with a first communication band. The second radio has a second network identifier and is associated with a second communication band. The second network identifier is different from the first network identifier. The medium access controller is configured to transmit using the first radio, a management frame including first information associated with the multi-link entity and second information associated with a second multi-link entity of a set of multi-link entities including the multi-link entity. The second multi-link entity may be associated with a third network identifier. The management frame may be a beacon frame and may be transmitted by the multi-link entity using a reporting link associated with the first radio and using a second link associated with the second radio. The reporting link may use the first communication band and the second link may use the second communication band. The apparatus may further include the second multi-link entity, which includes a second medium access controller. The apparatus may further include a third radio coupled to the second medium access controller. The third radio may have the third network identifier. The apparatus may further include a fourth radio coupled to the second medium access controller. The fourth radio may have a fourth network identifier. The fourth network identifier may be different from the third network identifier. The second multi-link entity may be configured to use a plurality of links and the second information may include operation parameters for each link of the plurality of links.

In at least one embodiment of a communications network, a method for operating a wireless communications network includes announcing first information for a reporting link of a plurality of links associated with a multi-link entity of the wireless communications network and second information for a reported link of the plurality of links. The reporting link is associated with a first network identifier and a first communication band. The reported link is associated with a second network identifier and a second communication band. The method includes selectively inheriting an element in the first information for the reporting link by the reported link in the absence of a corresponding element in the second information and based on an indication for uninheritance for the corresponding element.

Thus, techniques for announcing information (e.g., the information associated with multiple Basic Service Set Identifiers (BSSIDs) among multiple bands) for operation of multi-band entities in a communications network have been described. Although the invention is described herein with reference to specific embodiments, various modifications and changes can be made without departing from the scope of the present invention as set forth in the claims below. For example, while the invention has been described in embodiments of a WLAN compliant with an IEEE 802.11 standard, one of skill in the art will appreciate that the teachings herein can be utilized with other communications networks.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for operating a wireless communications network comprising:
   transmitting a management frame by a first multi-link entity of a set of entities using a reporting link associated with a first network identifier and a first communication band, the management frame including first information associated with the first multi-link entity and second information associated with a second link of the set of entities,
   wherein the second link is associated with a second network identifier.

2. The method, as recited in claim 1, wherein the first information includes capability or operation parameter information for the reporting link and the second information includes second capability or operation parameter information for the second link, the second link being associated with the first multi-link entity.

3. The method, as recited in claim 1, wherein the first information includes capability or operation parameter information for a first plurality of links of the multi-link entity and the second information includes second capability or operation parameter information for the second link, the second link being associated with a second entity of the set of entities.

4. The method, as recited in claim 3, wherein the second entity is a second multi-link entity and the second information includes operation parameters for each link of the second multi-link entity.

5. The method, as recited in claim 1, further comprising:
   changing an operation mode of the reporting link using the reporting link of the first multi-link entity.

6. The method, as recited in claim 1, further comprising:
   changing an operation mode of the reporting link using any link of the first multi-link entity.

7. The method, as recited in claim 1, further comprising:
   enabling or disabling the reporting link by the first multi-link entity using any active link of the first multi-link entity.

8. The method, as recited in claim 1, further comprising:
   enabling or disabling the reporting link by the first multi-link entity using the reporting link.

9. The method, as recited in claim 1, further comprising:
   inheriting third information for an element of the second link from a corresponding element of the first information in the absence of the element in the second information.

10. The method, as recited in claim 1, further comprising:
    selectively inheriting third information for an element of the second link from a corresponding element of the first information in the absence of the element in the second information and based on an indication for uninheritance.

11. The method, as recited in claim 1, wherein the management frame is a beacon frame and is transmitted by the first multi-link entity using the reporting link and using a third link of the first multi-link entity, the reporting link using the first communication band and the third link using a second communication band.

12. The method, as recited in claim 11, wherein the management frame is transmitted using all links of the first multi-link entity, wherein in the reporting link, the management frame includes third information for receiving other management frames using the second link of the first multi-link entity.

13. The method, as recited in claim 1, further comprising:
    transferring traffic identifiers between links of the first multi-link entity using a traffic identifier transfer announcement and acknowledgement frames.

14. The method, as recited in claim 1, further comprising:
    transferring traffic identifiers between links of the first multi-link entity using negotiation including traffic identifier transfer request and acknowledgement and traffic identifier transfer response and acknowledgement frames.

15. The method, as recited in claim 1, wherein the management frame is a beacon frame, the method further comprising:
    transmitting other management frames by the first multi-link entity using any active link of the first multi-link entity.

16. The method, as recited in claim 15, wherein the second link is affiliated with a second reporting link and the management frame includes third information associated with the second reporting link.

17. An apparatus comprising:
    a multi-link entity comprising:
        a medium access controller;
        a first radio coupled to the medium access controller, the first radio having a first network identifier and being associated with a first communication band; and
        a second radio coupled to the medium access controller, the second radio having a second network identifier and being associated with a second communication band, the second network identifier being different from the first network identifier,
    wherein the medium access controller is configured to transmit using the first radio, a management frame including first information associated with the multi-link entity and second information associated with a second multi-link entity of a set of multi-link entities including the multi-link entity,
  wherein the second multi-link entity is associated with a third network identifier.

18. The apparatus, as recited in claim 17, wherein the management frame is a beacon frame and is transmitted by the multi-link entity using a reporting link associated with the first radio and using a second link associated with the second radio, the reporting link using the first communication band and the second link using the second communication band.

19. The apparatus, as recited in claim 17, further comprising:
  the second multi-link entity comprising:
    a second medium access controller;
    a third radio coupled to the second medium access controller, the third radio having the third network identifier; and
    a fourth radio coupled to the second medium access controller, the fourth radio having a fourth network identifier, the fourth network identifier being different from the third network identifier,
  wherein the second multi-link entity is configured to use a plurality of links and the second information includes operation parameters for each link of the plurality of links.

20. A method for operating a wireless communications network comprising:
  announcing first information for a reporting link of a plurality of links associated with a multi-link entity of the wireless communications network and second information for a reported link of the plurality of links, the reporting link being associated with a first network identifier and a first communication band, and the reported link being associated with a second network identifier and a second communication band; and
  selectively inheriting an element in the first information for the reporting link by the reported link in the absence of a corresponding element in the second information and based on an indication for uninheritance for the corresponding element.

* * * * *